Figure 1:
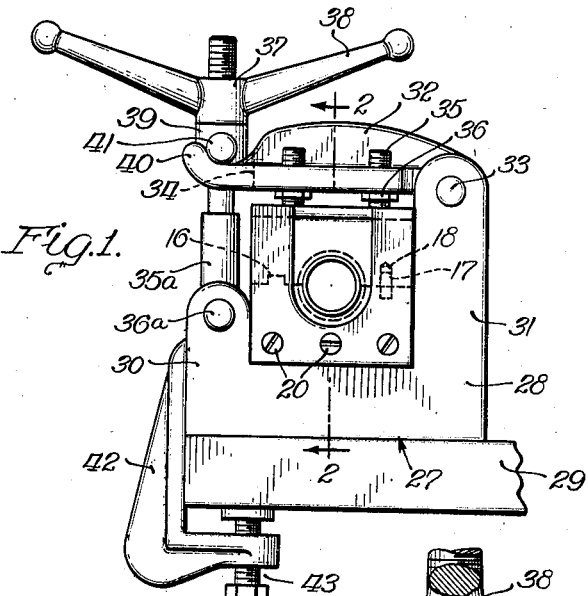

Aug. 4, 1942.   W. J. WACHOWITZ   2,291,666
CLAMPING DEVICE
Filed Aug. 10, 1939

INVENTOR.
Walter J. Wachowitz
BY
ATTORNEYS.

Patented Aug. 4, 1942

2,291,666

UNITED STATES PATENT OFFICE 2,291,666

CLAMPING DEVICE

Walter J. Wachowitz, Waukesha, Wis.

Application August 10, 1939, Serial No. 289,403

1 Claim. (Cl. 29—67)

This invention relates to fabricating means, for clamping metal structures such as metal tubing having coupling members applied to the ends thereof, pipe fittings and analogous devices.

My invention is directed to the provision of clamping means whereby the end of the metal tube can be cut accurately and a ferrule or analogous member secured on the tube end with expedition and facility. More specifically, I provide die blocks and associated holding means therefor effective for clamping the tubing and a member to be applied thereto in proper relation, the die blocks having associated therewith guide means for a saw blade assuring that the tubing is cut square, the die blocks also maintaining the ferrule or like member and the tubing in proper relation while the tubing is expanded within and thereby secured to the ferrule. Further objects and advantages of my invention will appear from the detail description.

Figure 2:
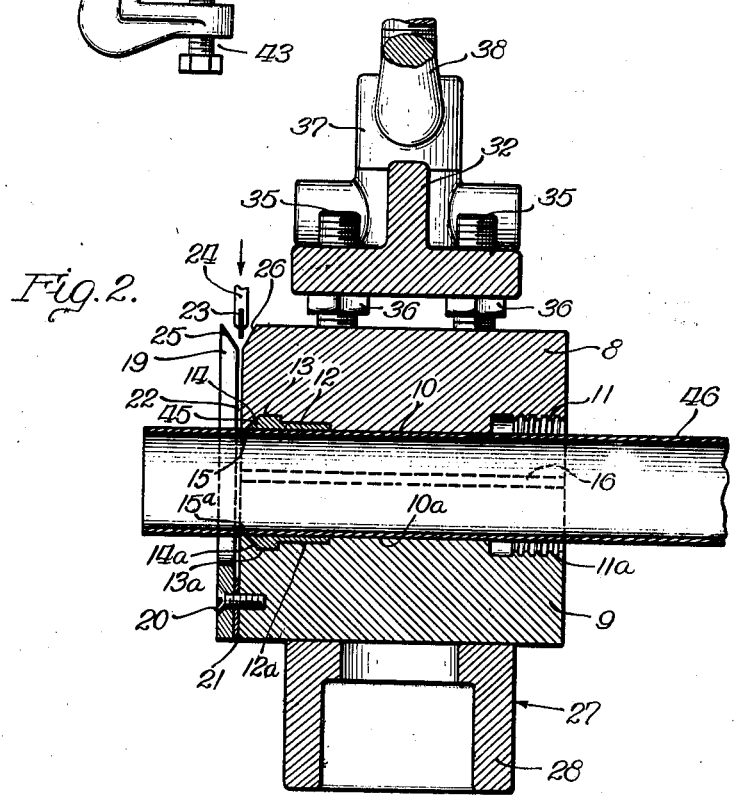

In the drawing:

Figure 1 is a front view of a pair of die blocks and associated holding means therefor as used for holding a tube and a ferrule associated therewith, the holding means being clamped to a support which is shown fragmentarily and broken away; and Figure 2 is a sectional view taken substantially on line 2—2 of Figure 1, on an enlarged scale, certain parts being shown broken away and in section.

The means for clamping the tube and the ferrules, or like members, for fabrication thereof, comprises upper and lower steel die blocks 8 and 9, these blocks being generally cubiform and of the same length and width, as shown. Block 8 is provided, at the mid-portion of one face thereof, with a semi-cylindrical recess 10 opening at one end into a threaded semi-cylindrical recess 11 of increased diameter and, at its other end, into a semi-cylindrical recess 12 of slightly greater diameter than recess 10, recess 12 opening, at its outer end, into a generally semi-cylindrical recess 13 of increased diameter, the outer portion of which is of frusto-conical shape, at 14, and terminates a short distance from the end of block 8 leaving a flat shoulder 15 defining a narrow semi-cylindrical recess of the same diameter as recess 10. Block 9 is provided with recesses 10a, 11a, 12a and 13a, the outer portion 14a of recess 13a being frusto-conical, and with a flat shoulder 15a; corresponding to the recesses and the shoulder of block 8. When the blocks 8 and 9 are disposed in superposed relation, with their recessed faces together and the recesses thereof in register one with the other, they define an intermediate cylindrical bore of a diameter to receive and tightly hold a tubing length upon which a ferrule or like article is to be secured, and end bores of proper size and shape for receiving ferrules to be secured upon the tube. When thus disposed the ends of the blocks are accurately aligned and provide plane surfaces.

In order to assure accurate positioning of the blocks, one relative to the other, the lower block 9 is provided, along one side of its upper face, with a rib 16, suitably secured thereto and fitting accurately in a corresponding groove in the upper block, there being a stud 17 suitably secured in block 9 adjacent the other side thereof and projecting upward therefrom, this stud fitting into a corresponding bore 18 in block 8. Any other suitable means may be provided for assuring accurate register of the blocks and corresponding accurate register of the recesses in the opposed faces thereof.

A U-shaped guide plate 19, preferably formed of steel, is secured to block 9 at one face and adjacent the lower end thereof, by means of screws 20, there preferably being a hardened steel spacing strip 21 disposed between the end of block 9 and plate 19, this strip being spaced an appreciable distance below the adjacent recess in the block. The arms of plate 19 extend upward along the end face of block 8, at opposite sides and spaced from the bore defined by the recesses in this end of the respective blocks, defining with the ends of the blocks a guide slot 22 for receiving and guiding blade 23 of a hack saw 24 of suitable type. Preferably the upper ends of arms 19 are beveled downward and inward, at 25, the upper forward corner of block 8 being beveled downward and inward with respect to slot 22, at 26, the surfaces 25 and 26 thus defining a downwardly converging passage which facilitates entry of the saw blade 23 into slot 22. As shown in Figure 1, the arms of the U-shaped guide plate 19 are disposed apart a width greater than the diameter of the bore formed by recesses 15 and 15a in the die blocks 8 and 9, respectively, so that an expanding tool or other means may be readily inserted into the tube to expand it into the ferrule.

Suitable means is provided for clamping the blocks 8 and 9 together for securing between them a tube and a ferrule or like member to be secured on the tube. This means comprises a substantially U-shaped frame 27 lower element 28 of which is of channel cross-section, as shown in Figure 2, and has a flat underface for seating upon a suitable support 29. Two arms 30 and 31 extend upward from the ends of element 28, arm 31 being of considerably greater height than arm 30. These arms 30 and 31 are spaced apart such a distance as to receive snugly between them lower block 9, with one side of upper block 8 in contact with the inner face of arm 31. A suitably reinforced pressure bar 32 is pivotally mounted at one end, at 33, in the upper end of arm 31, and is slotted at its other end, at 34. Bar 32 is of T cross-section, as shown in Figure 2, and is provided at each side with two suitably disposed screw studs 35 threading therethrough and secured in adjustment by associated jam nuts 36, these studs being disposed to contact the upper face of block 8 for transmitting pressure thereto. A T bolt 35a is pivotally mounted at its lower end, at 36a, in the upper end of arm 30. A pressure nut 37, provided with operating arms 38, screws upon the upper portion of bolt 35a and bears upon a collar 39 slidable on bolt 35a, the latter being engageable into slot 34 between upwardly curved fingers 40 at the adjacent end of pressure bar 32. Collar 39 is provided with two diametrically opposite studs 41 disposed to bear upon the upper faces of the fingers 40. By turning the nut 37 onto bolt 35 pressure is applied to the upper block 8 effective for clamping the two blocks 8 and 9 tightly together, in an obvious manner. Preferably arm 30 is provided with an integral depending L-shaped bracket 42 extending beneath support 29 and carrying a pressure screw 43, thus providing means for clamping the frame 27 to support 29.

In Figure 2 I have shown an exteriorly shouldered male ferrule 45, shaped conformably to the recesses 12 and 12a and 13 and 13a of the blocks 8 and 9, disposed about a length of tubing 46 disposed in the recesses 10 and 10a of blocks 8 and 9, this ferrule and the tubing being clamped between the blocks. The end portion of the tubing, projecting beyond the end of the blocks at which the guide plate 19 is disposed, is then cut off by means of the hack saw 24, leaving a short length of the tubing, corresponding to the width of shoulder 15, extending beyond the outer end of ferrule 45, this outer end of the ferrule being beveled and of substantially conical shape, the ferrule being of known type and having an outwardly extending circumferential shoulder and a reduced neck extending therefrom, as shown. After the projecting portion of the tubing has been cut off as described, the portion of the tubing within the ferrule 45 is expanded, by means of a suitable tool, thus securing the ferrule upon the tubing so as to, in effect, form an integral structure therewith. After that has been done, the tubing may be repositioned between the blocks 8 and 9 so that the end portion of the tubing bearing the ferrule extends outwardly beyond the guide plate 19 in position readily accessible for further operations, the tubing being then again clamped between the blocks, or the tubing may be removed from between the blocks 8 and 9 and secured in any other suitable manner. When it is desired to apply a threaded female ferrule to the ends of tubing 46, the end of tubing 46 is cut off square, as before, the cut tubing is then released from the blocks 8 and 9 and reversed therein, the cut end portion of the tubing then extending through a threaded ferrule disposed in the recesses 11 and 11a of the blocks 8 and 9, after which the tubing is expanded in the aforementioned ferrule securing the latter upon the tubing so as to, in effect, form an integral structure therewith.

While I have disclosed the clamping means of my invention, by way of example, as used for straight tubing and ferrules or like members, it may be used to advantage with short pieces of tubing and ferrules for producing pipe fittings, such as elbows, T's and crosses, it being understood, of course, that the recesses in the die blocks, or equivalent members, may be appropriately shaped in accordance with the particular article which it is desired to produce.

I claim:

Means for holding in proper relation a tube the end of which is to be cut and a ferrule to be secured upon the tube adjacent the cut end thereof, comprising two superimposed die blocks each provided in one face in the mid-portions thereof with a tube receiving semi-cylindrical recess, an intermediate ferrule receiving semi-cylindrical recess coaxial with but of greater radius than said tube receiving recess and opening thereinto, and an end recess of substantially the same radius as said tube receiving recess and opening into said ferrule receiving recess, means for clamping said blocks together with the recessed face of one seating against the recessed face of the other with the respective recesses of said blocks in register whereby said end recesses define an end bore, said tube receiving recesses define a bore substantially of the same diameter as said end bore, and said ferrule receiving recesses define a bore of greater diameter than said end and tube receiving bores, said ferrule receiving bore being shaped to receive and hold a ferrule against relative movement longitudinally in either direction of the axes of said bores, a guide plate having a substantially U-shaped slot of a width greater than the diameter of said end bore secured to one end of the lower block with the closed end of the slot substantially below said end bore, the arms of said guide plate defining said slot extending upwardly in parallel relation with the ends of said blocks and defining therewith a guide slot perpendicular to the axes of said bores for the reception of a saw blade.

WALTER J. WACHOWITZ.